Jan. 14, 1947. H. E. THOMAS 2,414,280
VARIOMETER
Filed Sept. 27, 1944
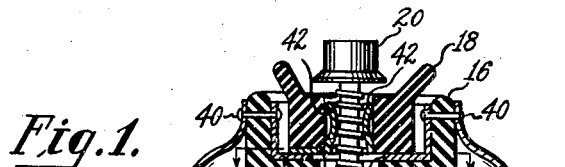
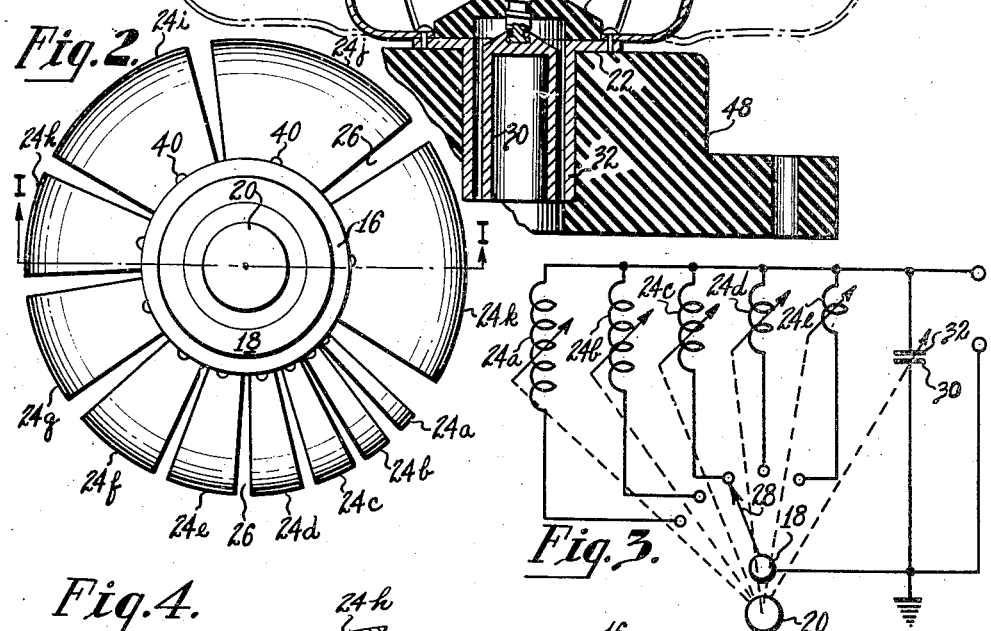
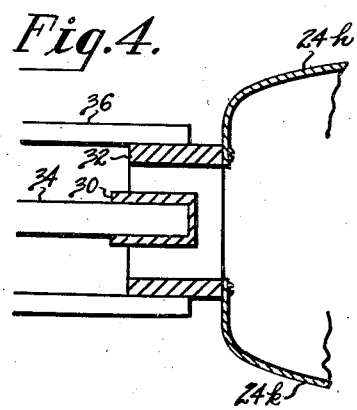
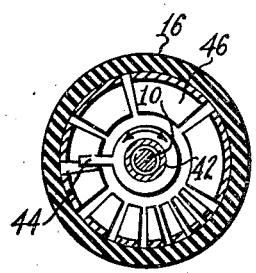
INVENTOR.
HARRY E. THOMAS
BY
ATTORNEY Patented Jan. 14, 1947

2,414,280

UNITED STATES PATENT OFFICE 2,414,280

VARIOMETER

Harry E. Thomas, Haddonfield, N. J., assignor to Radio Corporation of America, a corporation of Delaware Application September 27, 1944, Serial No. 555,911

6 Claims. (Cl. 250—40)

This invention relates to a variometer for use in circuits carrying currents which alternate at ultra-high frequencies; that is to say, frequencies in excess of 200 megacycles per second, and to a wave meter for such frequencies.

The inductance and capacitance which are represented at low frequencies by coils and condensers are replaced at ultra-high frequencies by the lumped inductance and capacitance of concentric transmission lines. The problem of tuning or otherwise adjusting such lines is a complex one; and the methods currently employed in such adjustment are inconvenient and unsatisfactory, and uncertain in result.

It is an object of the invention to provide an improved and compact variometer for use at ultra-high frequencies.

Another object of the invention is to provide an improved, compact and portable wave meter capable of being varied over a wide range of the ultra-high frequencies.

Another object of the invention is to provide an improved wave meter including a compact, variable inductor.

A further object of the invention is to provide a device which may be conveniently employed for the tuning and adjustment of concentric transmission lines.

To achieve these objects, the invention makes use of the principle that the inductance of a flat, conductive strip is a function of its width, and of the further principle that the inductance of a flexible, current-carrying conductor is a function of the area embraced by the conductor. The invention provides for an assembly of a plurality of flexible, conductive strips of progressively different widths, together with means for switching each of the strips as desired into a circuit and thereby to vary the inductance of the circuit. Simple means are provided for collapsing and extending the strips to vary the area which they embrace, and thus a further variation of inductance is obtained. The combination of such an inductor with a capacitor, fixed or variable, provides an LC circuit which may be used as a wave meter of the absorption type, and simple means are also provided for connecting such a combination to a concentric transmission line for the tuning or other adjustment of the line.

The invention may be better understood from a consideration of the following description of two embodiments thereof, when read in conjunction with the accompanying drawing, in which:

Figure 1 is a view in vertical section of a wave meter constructed in accordance with the invention, Figure 2 is a plan view of the device of Figure 1, when in the position marked "B" in Figure 1, Figure 3 is a schematic diagram of the equivalent electrical circuit of the device of Figures 1 and 2, Figure 4 is a fragmentary view in vertical section of apparatus for tuning a concentric transmission line, and Figure 5 is a view in horizontal section of a detail of the device of Figure 1, taken along the line V—V of Figure 1.

The device illustrated by Figs. 1 and 2 includes a control shaft 10 of suitable low-loss, conductive material, preferably silver-plated copper, and provided along substantially its entire length with coarse threads 12. The shaft may be hollow, since high frequency current will flow on its outer surface. A bottom assembly nut 14 of insulating material is secured to the shaft at its lower end, and a conductive ring 22 is secured to this nut but spaced from the shaft 10. A top assembly ring 16, a range knob 18 and a vernier knob 20 are mounted in the order shown in Fig. 1 on the shaft adjacent its other end. These three elements are all of insulating material, and are adapted to move along the shaft 10.

A plurality of flat, flexible conductive strips 24a to 24k, inclusive, are secured to the insulating assembly ring 16, adjacent to their upper ends, by rivets 40 which extend through that ring to its inner surface. Silver-plated copper is the preferred material for the construction of these strips also, because of its excellent conductivity and because it makes good sliding contact with other elements of the device with which it is desired to make an electrical connection. The strips are arranged in side-by-side relation, with spaces 26 between, which insulate them from each other. They are all secured at their lower ends to the conductive ring 22 and are, therefore, in parallel with each other, but are insulated from the shaft at the lower end by the nut 14 and at the upper end by the ring 16. The strips are of progressively different widths, ranging in one embodiment according to the invention from one-eighth inch for strip 24a to two inches for strip 24k.

The range knob 18 has a collar 42 of spring material which makes tight contact with the shaft 10. Connected to the collar at the lower end is a radial insert 44, which is set into the lower face of the knob. The rivets 40, each of which is connected at its outer end to one of the strips 24, are connected at their inner ends to L-shaped contact members 46, which are set into the inner face of the assembly ring 16, and the base of which is adapted to make contact with the insert 46. The collar 42, the insert 44, the contact members 46 and the rivets 40 are all of conductive material, so that when the insert 44 makes contact with one of the contact members 46, there is a direct low-loss path from the shaft 10, through the collar 42, the insert 44, one of the contact members 46 and the rivet 40 to which it is connected, to one of the strips 24.

Rotation of the range knob 18 determines with which of the contact members the insert makes contact, and therefore with which of the strips the shaft makes contact. Since each of the strips is of different width, and therefore of different inductance in any given vertical position, it is possible by operation of the range knob to vary the inductance of the circuit thus constituted.

A further variation of inductance may be obtained by means of the vernier knob 20. Operation of the vernier knob causes movement of the range knob and of the assembly ring 16 along the shaft 10. The bottom assembly nut 14, however, is secured against movement; and as the top assembly ring approaches it, the flexible strips secured at their ends to the top assembly ring and the bottom assembly nut, respectively, are caused to collapse, as shown by the dotted lines in Fig. 1. Fig. 2 is a plan view of the device of Fig. 1, when in the position indicated by the dotted line marked "B" in Fig. 1. Operation of the vernier knob in an anti-clockwise direction causes the strips to resume their original position. Since the inductance of a conductor is a function of the area which it embraces, the variation in the area embraced by the strip connected to the shaft 10 causes a corresponding variation in its inductance.

A capacitor having inner and outer plates 30 and 32, respectively, is disposed in the base 48. The inner plate 30 is secured to the lower end of the shaft 10 and the outer plate 32 is secured to the base 48. The plates are preferably cylindrical and cup-shaped, one of them being nested within the other, as shown in Fig. 1. They may be of the same low-loss material, silver-plated copper, as the strips 24. The inner plate 30 makes a direct electrical connection with the shaft, while the outer plate 32 is connected to the conductive ring 22, and therefore to the strips 24. The equivalent electrical circuit of the device is shown in Fig. 3. If the outer plate 32 is regarded as the low potential end, the circuit may be traced through whichever of the strips 24 is connected to the shaft, through the shaft itself back to the inner plate 30 of the capacitor.

While the inductance of the shaft may be taken into account in considering the inductance of the circuit constituted by the shaft, the strip with which it is connected and the connecting means, the range of inductance variation obtainable is not materially affected by the omission of this factor.

With a variation in the width of the strips from one-eighth inch to two inches, a range of inductance from .09 microhenry to .04 microhenry is obtainable with the strips in their uncollapsed condition. By varying the area embraced by the strips, as before described, it is possible to extend this range from .04 microhenry to .02 microhenry. In this embodiment the strips were 4 inches long and .010 inch thick. A capacitor having a maximum capacity of 5 micro-micro farads was used, and the overall length and diameter of the device did not exceed 6 inches and 5 inches, respectively. By the use of this device, it was found possible to measure waves having frequencies in the range from 200 megacycles per second to 1000 megacycles per second.

It will thus be seen that the device is both portable and compact. In appearance it resembles a hollow pumpkin with the shaft as a stem from which the capacitor protrudes downwardly, and with vertical slots dividing the shell constituted by the strips 24. To use the device as a wave meter, it is necessary only to bring it within the field of the oscillations to be measured, and to operate the range and vernier knobs until its reaction on the source of oscillations is observed and a condition of resonance is indicated by any suitable means. It is not necessary, as with Lecher wires, to bring the source of oscillations to the meter, and all the difficulties attendant upon the use of shorting bars and the like are avoided. The device may be supported upon a table-like support, the top of which is indicated at 48. This avoids excessive handling of the device, and the introduction of complications resulting from capacity between the body of the operator and the apparatus.

The device may be calibrated by appropriate markings on the shaft, the range knob and, if desired, on the inner plate of the capacitor.

The use of the invention as a variometer or tuning device is shown in Fig. 4, in which inner and outer conductors of a concentric line are indicated at 34 and 36, respectively. The inner plate 30 of the capacitor is made of such diameter as to fit tightly over the inner conductor 34 of the line, while the outer plate 32 is designed to fit tightly within the outer conductor 36. By this means, a simple and effective contact is made with the concentric line, and the inductance of the device may then be varied to tune or otherwise to adjust the line.

Whether used as a wave meter or as a variometer or tuner, the capacitor constituted by plates 30 and 32 may have either fixed or variable capacity.

There has thus been described a wave meter including a variable inductor, constituted by flexible, conductive strips of varying width, with means for switching any one of the strips into an ultra-high frequency circuit of the meter and for thereby varying its inductance. Means are also provided for collapsing the strips and thereby for varying the area which they embrace. A further change of inductance is thus created. When combined with a capacitor, the variable inductor thus constituted may be used as a wave meter, and when the capacitor is properly designed, as a means for tuning a concentric transmission line.

I claim as my invention:

1. A device for ultra-high frequencies, comprising the combination of a plurality of flexible, conductive strips of progressively different widths, said strips being insulated from each other and each shaped to form less than one full turn of a loop, of means for connecting each of said strips in turn in an ultra-high frequency circuit, and of means for varying the area embraced by the strip so connected.

2. A portable absorption wave meter for ultra-high frequencies, including a variable inductor composed of a plurality of flexible, conductive strips of progressively different widths, said strips being insulated from each other and each shaped to form less than one full turn of the loop, a capacitor, means for connecting each of said strips in turn to said capacitor, and means for varying the area embraced by the strip so connected.

3. A device of the character described, comprising a conductive shaft, a capacitor having one of its plates in electrical contact with said shaft adjacent one of its ends, a plurality of flexible, conductive strips of different widths arranged about said shaft and spaced laterally therefrom and from each other, one of the ends of all of said strips being electrically connected to the other plate of said capacitor and the other ends of said strips being physically connected to the other end of said shaft but insulated therefrom, means for making an electrical connection between said shaft adjacent its said other end and each of said strips adjacent their said other end, and means for varying the area embraced by said strips.

4. A portable absorption wave meter for ultra-high frequencies, comprising a conductive shaft, a capacitor having one of its plates in electrical contact with said shaft adjacent one of its ends, a plurality of flexible, conductive strips of different widths arranged about said shaft and spaced laterally therefrom and from each other, one of the ends of all of said strips being electrically connected to the other plate of said capacitor, and the other ends of said strips being physically connected to the other end of said shaft but insulated therefrom, contact means for connecting said shaft adjacent its said other end with each of said strips in turn adjacent their said other ends, whereby to form a loop constituted by said shaft and one of said strips, and means for varying the area embraced by said loop.

5. A portable absorption wave meter for ultra-high frequencies, comprising a conductive shaft, a pair of insulating members mounted on said shaft adjacent its respective ends, a capacitor having one of its plates in electrical contact with said shaft adjacent one of said ends, and its other plate physically connected to one of said members adjacent said end, a plurality of flexible, conductive strips of different widths arranged about said shaft and spaced laterally therefrom and from each other, one of the ends of all of said strips being electrically connected to said other plate of said capacitor, and the other ends of said strips being secured to the other of said members, contact means for connecting said shaft adjacent its other end with each of said strips in turn adjacent their said other ends, whereby to form a loop constituted by said shaft and one of said strips, and means for moving said members along said shaft relatively to each other whereby to vary the area embraced by said loop.

6. A tuner for a concentric line, comprising a capacitor having inner and outer nested, cylindrical, cup-shaped plates, the inner plate being adapted to fit tightly around the end of the inner conductor of said line, and the outer plate being adapted to fit tightly within the end of the outer conductor of the line, a conductive shaft in electrical contact with said inner plate adjacent one of the ends of said shaft, a plurality of flexible, conductive strips of different widths arranged about said shaft and spaced laterally therefrom and from each other, one of the ends of all of said strips being electrically connected to the outer plate of said capacitor and the other ends of said capacitor being physically connected to the other end of said shaft but insulated therefrom, means for making an electrical connection between said shaft adjacent its said other end and adjacent strips adjacent their said other ends, and means for varying the area embraced by said strips.

HARRY E. THOMAS.